Figure 1:
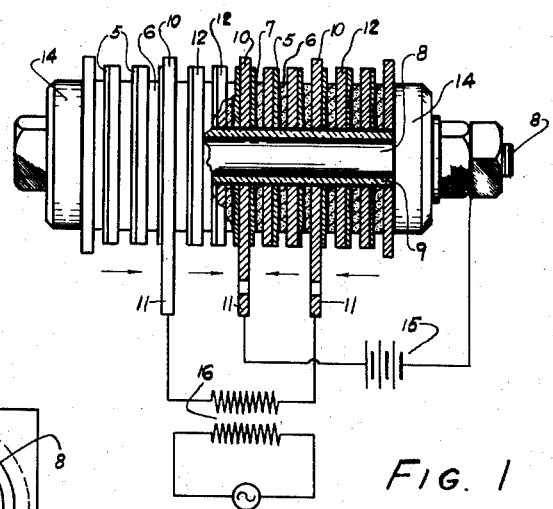

June 6, 1933.   C. HAMBUECHEN   1,912,636
ELECTRIC CURRENT RECTIFIER

Filed Jan. 16, 1929

INVENTOR
CARL HAMBUECHEN
BY
Eilers + Schauenburg,
ATTORNEYS

Patented June 6, 1933

1,912,636

UNITED STATES PATENT OFFICE

CARL HAMBUECHEN, OF ST. LOUIS, MISSOURI

ELECTRIC CURRENT RECTIFIER

Application filed January 16, 1929. Serial No. 333,032.

My invention relates to electric current rectifiers, and more particularly to the type known as dry element contact rectifiers. This type of rectifier has been known and used for many years.

In construction, my rectifier is somewhat similar to the one described by Pawlowski, U. S. Patent No. 830,924, dated September 11, 1906, in that it is composed of electro-positive elements, for example, aluminum or magnesium, and electro-negative elements such as copper sulphide, the elements being arranged to give either full wave or half wave rectification.

I have discovered that numerous advantages can be gained by the employment of a novel process in the production of the rectifier cells, each of which comprises an electro-positive element in operative position with an electro-negative element. This process, hereinafter described, and for convenience denoted as a "wet process", results in the formation of a rectifying and bonding material between the cell elements, coextensive with the inner surfaces. Any voids that would otherwise exist between the elements, due to surface irregularities, are filled with the rectifying material, and thus rectification is not restricted to regions on limited areas, but takes place over the entire inner surfaces. Higher current values can therefore be used at relatively low current densities, which avoids unnecessary heating of the unit and results in greater efficiency. I have found that my unit operates with a minimum current fluctuation throughout its useful life.

The successful operation of a dry contact rectifier is dependent, in large measure, upon the composition and structure of its elements. I have discovered a process in the production of electro-negative elements which gives the elements certain qualities, namely a uniform and dense structure, that make them well suited for this type of rectifier.

This method consists in covering the bottom of a shallow pan with a mixture of finely divided sulphur and an inert material, for example, pumice. Copper washers of the desired dimensions are placed on this mixture and the pan put upon a hot plate in a chamber covered with a perforated lid, which allows any excess of sulphur to escape and permits air to enter the chamber. I find that the most desirable operating temperature occurs when the hot plate is heated to a dull red. After a few minutes, the sulphur melts and ignites, which raises the temperature of the copper washers to a point where a reaction takes place between the copper and sulphur. This reaction is manifested by the washers becoming a dull red, due to the uniting of the sulphur and copper. After the reaction is completed, the washers are allowed to cool to the lower temperature of the chamber.

The inert material, above referred to, provides a convenient support for the washers during the recited process, and being of a heat insulating nature, assists in maintaining an even distribution of heat about the washers, prevents warping and distortion, and produces washers which are substantially uniform in shape, and homogeneous throughout.

For the purpose of certain constructions, it may be desirable to have washers which can withstand considerable pressure and abuse. Additional mechanical strength can be obtained by rendering the washers plastic by a second application of heat and subjecting them to pressure while in that condition.

The next operation in the construction of the rectifier is the forming of the cells by my "wet process". An electro-positive and electro-negative element are brought together to constitute a cell and, while so disposed, are thoroughly moistened as by submerging in a bath of water or suitable solution. The elements, being in a short circuited relation, and widely divergent in their inherent electrical properties, a battery action is set up which causes a current to flow between them. The sulphide is acted upon and hydrogen sulphide liberated, indicating a reduction of the cuprous sulphide to a sulphide of lower valence, and the aforementioned rectifying material, formed by the partial disintegration of the elements, is deposited between the electro-positive and electro-negative elements and unites them into a rectifying cell.

The cells, then assembled on a bolt to form a unit, are subjected to pressure which is maintained as by a nut on the bolt. The reaction referred to continues while the unit is in this condition and until the aforementioned material between the elements has become dry. The entire assembly is then thoroughly dried by applying heat, as in an oven, and may then be utilized for rectifying alternating current. I prefer, however, to subject the unit to an electrical load for a short period of time to insure steady operating conditions, after which the rectifier is ready for service.

Figure 2:
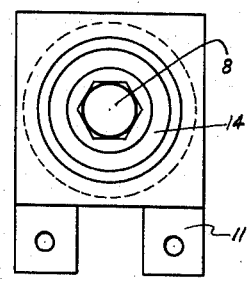
Figure 3:
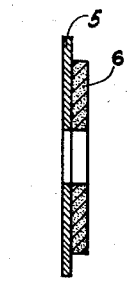
Figure 4:

In the accompanying drawing, Fig. 1 shows a preferred embodiment of my invention, the elements being assembled in the well known Gratz, or bridge, arrangement to give full wave rectification. Wiring connections for charging a battery are shown diagrammatically in this figure. Fig. 2 is an end view of the rectifier illustrated in Fig. 1. Figs. 3 and 4, respectively, are sectional views through a couple, before and after having been treated by the "wet forming process" hereinbefore described.

Each couple comprises an electro-positive element 5, such as aluminum or magnesium, and an electro-negative element 6, such as copper sulphide, operatively connected and bonded together by a material 7 formed in the manner described above. In the present example, the elements are in the shape of circular washers. As shown in Fig. 1, the couples are assembled on a bolt 8, but held out of immediate electrical contact therewith by means of a tube 9 of fiber or other suitable insulating material. Heat radiation plates 10 having terminal projections 11, divide the assembly into four sections. Current is adapted to flow through the sections in the directions indicated by the arrows in Fig. 1. The number of couples in each section is dependent upon the voltage at which the device is intended to operate. Suitable metallic washers, such as brass, 12, are disposed between adjacent couples. The recited couples and washers are clamped under considerable pressure between metal collars 14. The bolt and the centermost plate 10 provide the D. C. terminals of the device, and a battery 15 is shown connected to these terminals. 16 indicates a transformer which is connected to the A. C. terminals of the device.

I claim as my invention:

1. The herein described method of forming a dry element contact rectifier which consists in arranging an electro-positive and an electro-negative element in contacting cell-forming relation, moistening the elements to promote a natural galvanic reaction therebetween and thereafter drying the assembly.

2. The herein described method of forming a dry element contact rectifier which consists in forming, in the presence of an electrolyte, a short circuited couple between materials having dissimilar electro-chemical properties, and forming a cell, comprising said elements, having the products of electrolytic decomposition disposed between said elements.

3. The herein described method of sulphiding metal which consists in disposing the metal in a receptacle containing a substantially homogeneous mixture including an element of the sulphur group and an inert solid, and applying heat to said mixture.

4. The herein described method of sulphiding metal which consists in disposing the metal in a receptacle containing an intimate mixture of an element of the sulphur group and an inert solid, and applying heat thereto.

5. The herein described method of sulphiding metal which consists in disposing the metal in a receptacle containing a mixture of an element of the sulphur group and a finely divided inert material, and applying heat thereto.

6. The herein described method of sulphiding metal which consists in disposing the metal in a receptacle containing a mixture of ground sulphur and pulverized pumice, and applying heat thereto.

7. The herein described method of forming copper sulphide which consists in disposing copper in a receptacle containing a mixture of ground sulphur and pulverized pumice, partially enclosing the receptacle, and applying heat to initiate reaction.

8. The herein described method of preparing rectifier materials which consists in utilizing a finely divided inert material as a support for a metallic element during the process of sulphiding said element.

9. The herein described method of preparing rectifier materials which consists in utilizing a finely divided inert material intermixed with an element of the sulphur group to maintain the original shape of the metallic element in the process of sulphiding said element.

10. The herein described method of manufacturing a dry element rectifier including an electropositive and an electronegative element, which consists in assembling said elements in adjacence to each other, then in utilizing moisture to cause an electrochemical reduction of the electronegative element, resulting in the formation and deposition of a rectifying material which bonds the electropositive and the electronegative elements together, and in drying the assembly to arrest formation of said material.

CARL HAMBUECHEN.